United States Patent [19]

Rudelick

[11] 4,314,673
[45] Feb. 9, 1982

[54] MIXING FAUCET VALVE WITH DIVERTER AND STOP CHECK SYSTEM

[75] Inventor: John Rudelick, Milwaukee, Wis.

[73] Assignee: Universal-Rundle Corporation, New Castle, Pa.

[21] Appl. No.: 152,880

[22] Filed: May 23, 1980

[51] Int. Cl.³ .............................................. F16K 19/00
[52] U.S. Cl. .................................. 239/443; 137/597; 137/614.2; 137/625.17; 137/861
[58] Field of Search ...................... 137/119, 597, 614.2, 137/625.17, 625.4, 625.41, 861; 4/192; 239/25, 32, 443

[56] References Cited

U.S. PATENT DOCUMENTS

| | | | |
|---|---|---|---|
| 1,777,434 | 10/1930 | Herzbrun | 137/597 |
| 2,507,467 | 5/1950 | Fredrickson | 137/119 X |
| 2,519,158 | 8/1950 | Symmons | 137/597 |
| 2,977,988 | 4/1961 | Drobilits | 137/625.4 X |
| 3,736,959 | 6/1973 | Parkison | 137/625.17 |

Primary Examiner—Robert G. Nilson
Attorney, Agent, or Firm—Arnstein, Gluck & Lehr

[57] ABSTRACT

A mixing faucet valve having a check valve in each liquid supply line to prevent syphoning of liquid and crossover of liquid into a supply line in the event of reduced pressure in a line. The valve also includes a Venturi type arrangement for automatically diverting the outflow of liquid from a principal discharge spout to an auxiliary spray hose attachment when the valve to the spray hose is opened.

6 Claims, 3 Drawing Figures

MIXING FAUCET VALVE WITH DIVERTER AND STOP CHECK SYSTEM

BACKGROUND OF THE INVENTION

The present invention relates to a mixing faucet valve having anti-syphoning means and means for selectively diverting unmixed or blended liquids to one of a plurality of possible outlets.

SUMMARY OF THE INVENTION

One of the objects of this invention is the provision of a mixing valve which will automatically divert the outflow of liquid from a principal discharge passage, such as a faucet spout, upon the manual opening of a control valve associated with an auxiliary passage, such as a spray hose attachment.

Another object of this invention is the provision of a mixing valve of this type incorporating anti-syphon means of novel simple construction to prevent any upstream syphoning of the water or liquid back through the valve, in the event of a reduced pressure in the liquid supply, and also to prevent cross-flow between the hot and cold supply lines, in the event the pressure drops in either line.

BRIEF DESCRIPTION OF THE PREFERRED EMBODIMENTS

Figure 1:
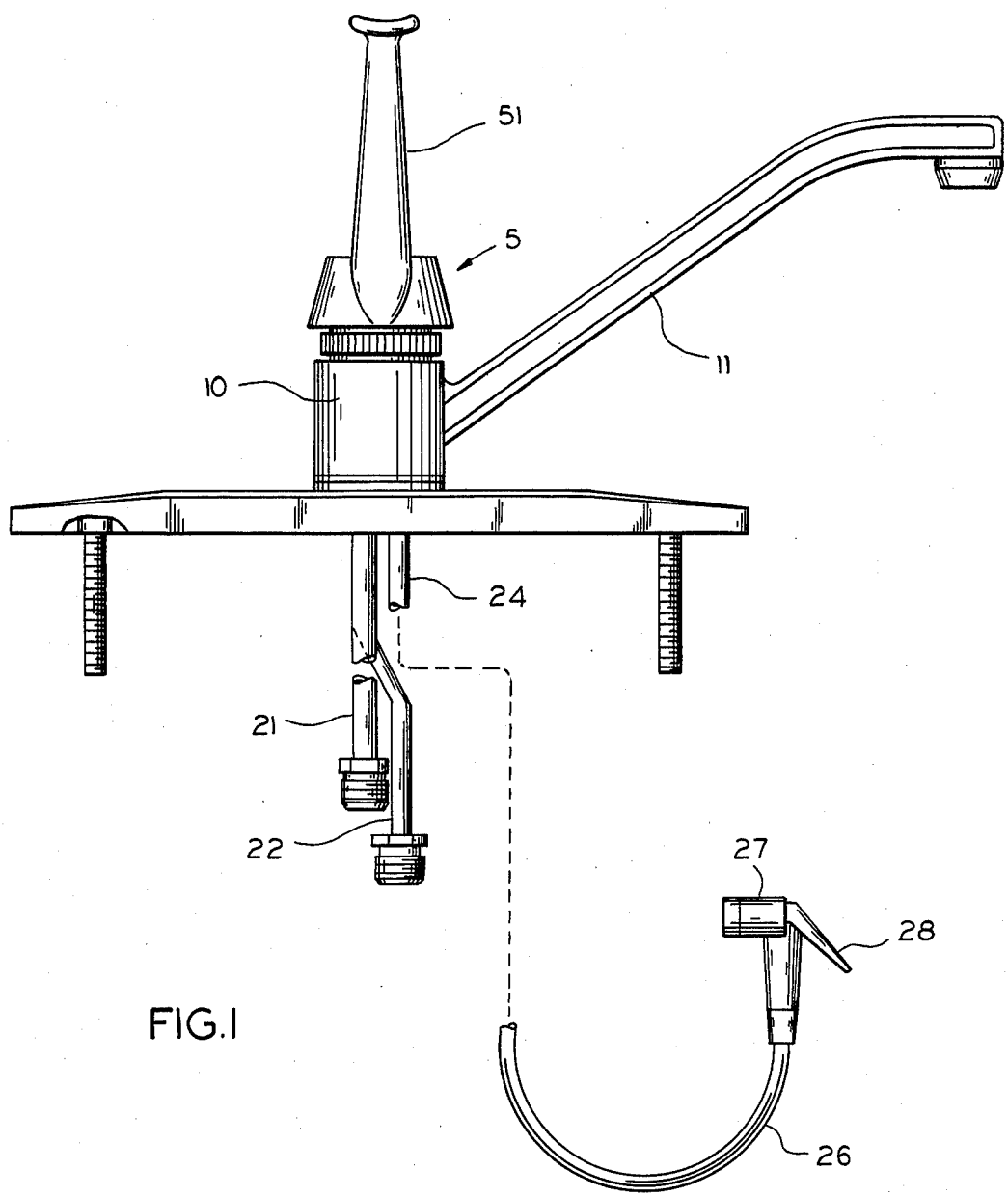
FIG. 1 is a front elevational view of a mixing faucet assembly in combination with a spray attachment.
Figures 2, 2A:
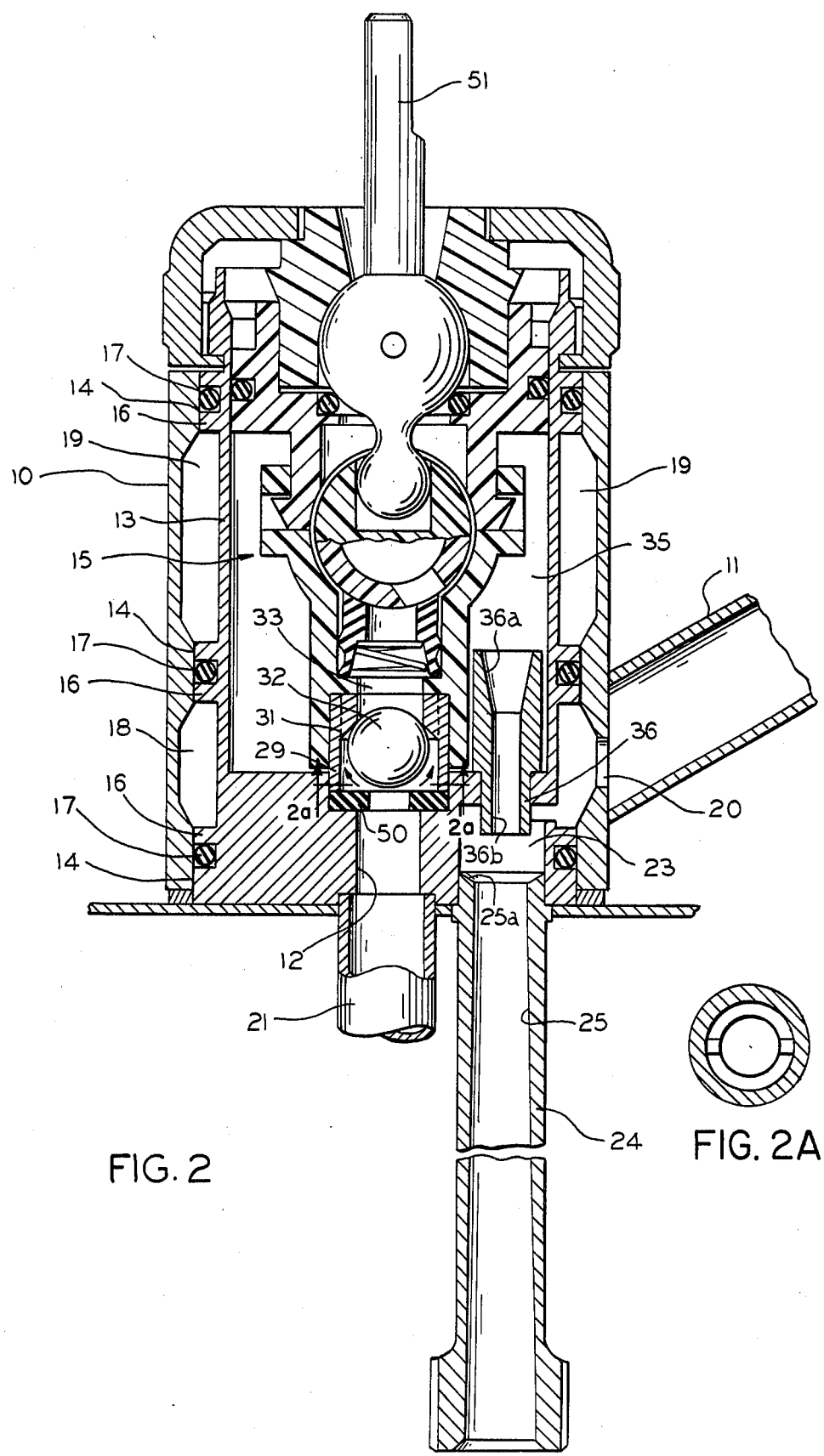
FIG. 2 is a vertical cross-sectional view of one embodiment of my invention showing the valve assembly mounted in the body of mixing valve.
FIG. 2a is a horizontal cross-sectional view taken on the line 2a—2a of FIG. 2 showing the ball and cage check valve of my invention with the ball removed.

Referring to FIGS. 1 and 2 of the drawings, my invention is shown as embodied in a single lever faucet 5, although it will be understood that my invention has application to other types of faucets and valves. The faucet includes a generally cylindrical outer shell or casing 10 provided with a spout 11. The casing 10 encloses a body portion 13 of the valve 15 presently to be described. The casing is provided with three axially spaced bore sections 14, 14, 14 of reduced diameter. The body portion 13 is formed with three correspondingly spaced circumferentially extending ridges 16, 16, 16, each of which is grooved to receive an O-ring 17. Two axially spaced annular fluid passages 18 and 19 thus are defined between the body portion 13 and the interior of the casing 10. An opening 20 in the wall of the casing 10 affords communication between the lower annular passage 18 and the spout 11 for the passage for water or other liquid. A pair of passages 12 are provided in the lower end of the body portion 13 and are adapted, one to receive a cold water inlet pipe 21 and the other a hot water inlet pipe 22, respectively. A third passage or chamber 23 provided in the lower end of the body portion 13 receives the upper end of a Venturi tube 24, to the lower end of which is connected a flexible hose 26 leading to a spray head 27 having a manually operable valve 28. Each of the passages 12 is enlarged to receive a check valve 29 which includes a cage 31 and a ball 32. The upper end of each cage 31 communicates respectively with a passage 33 in the valve cartridge 15, while the lower end of the cage 31 is seated on a rubber washer 50. The structure and operation of the cartridge valve 15 is fully described in copending application Ser. No. 070,557, entitled SINGLE LEVER FAUCET PLASTIC CARTRIDGE VALVE, now U.S. Pat. No. 4,226,260, and forms no part of the present invention.

A tubular nozzle 36 is secured within the body portion 13 in substantially coaxial registration with the Venturi tube 24. The bore of the nozzle 36 provides a somewhat restricted passage between chambers 35 and 23. The nozzle 36 includes a flared or truncated conical inlet bore 36a and a lower cylindrical bore 36b which terminates short of the entrance to the Venturi tube 24 but below the passage 20. The Venturi tube includes a truncated conical bore 25 with its maximum constriction being uppermost and adjacent a flared mouth 25a.

In operation, when the control handle 51 of the faucet 5 is moved to open position, water enters the body portion 13 from the hot and cold water supply lines 21 and 22 and passes through the opening in washer 50, around the ball 32 and through the cartridge 15 into chamber 35 of the body portion 13 and then through nozzle 36. During normal use the spray hose valve 28 is closed and water flowing through the nozzle 36 will be caused to flow into chamber 23 and through opening 20 into the faucet spout 11.

It is noted that the cylindrical bore 36b of nozzle 36 is smaller than the constricted bore 25 of tube 24. Thus, when the spray hose valve 28 is opened, the flow from nozzle 36 will pass directly into the mouth of tube 24 with increased velocity and flow through hose 26 into the spray head 27. Such flow results in a negative pressure in chamber 23 so that there is no concurrent flow of water through the faucet spout 11. When valve 28 is closed liquid will flow from chamber 23 through passage 20 into spout 11.

In the event either of the supply lines 21,22 is subjected to a negative pressure the balls 32 will drop onto their respective washers 50 and act as check valves preventing syphoning of water into either of the supply lines. The check valves also insure against cross flow from hot to cold supply lines and vice versa.

Figure 3:
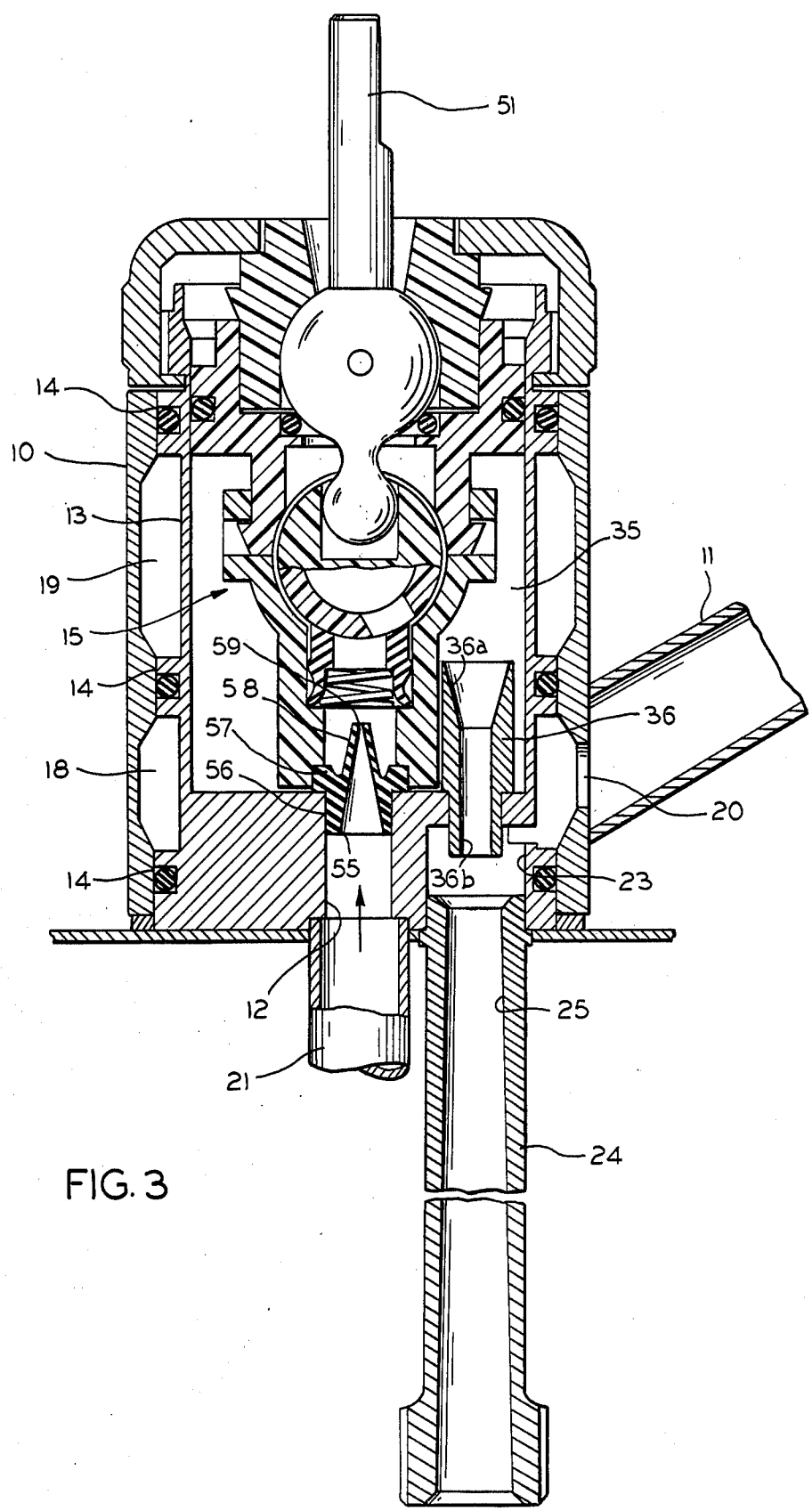
FIG. 3 is a view similar to FIG. 2 showing a modified embodiment of my invention.

In the embodiment illustrated in FIG. 3, the modification differs only in certain respects from the device shown in FIG. 2 and, accordingly, like reference numerals have been applied to like parts. In this embodiment the ball type check valve 29 of FIG. 2 is replaced by a check valve 55 formed of elastomeric material and of the type commonly known as duckbills. Such valves are of conventional construction and are manufactured by Vernay Laboratories, Inc. of Yellow Springs, Ohio.

As seen in FIG. 3, the valve 55 includes a cylindrical body 56 having an annular flange 57 and a pair of thin cooperating angularly related lips 58 having a slit opening 59 at the apex. In operation, the valve 55 functions to allow water to flow from the supply lines 21,22 only in the direction of the arrow, with the slit opening enlarging to permit the flow of water through the valve 15. In the event of a negative pressure in either of the supply lines 21,22, the slit openings close to prevent a reverse flow or syphoning of liquid into either supply line or cross-flow from one supply line to the other. In all other respects this embodiment functions in the same manner hereinabove described.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. An anti-syphoning mixing faucet valve comprising, an outer casing having an outlet communicating with a spout, a generally cylindrical body portion having a bottom wall defining a valve chamber and a discrete auxiliary chamber, said auxiliary chamber having a discharge opening communicating with said spout, said bottom wall having a pair of inlet passages each adapted to be connected to a liquid supply line, a check valve received in each of said inlet passages and adapted to close opposite to the direction of normal flow through said passages, a control valve received in said valve chamber and having a pair of inlet passages each communicating with a respective one of said bottom wall inlet passages, a nozzle in said body portion providing communication between said valve chamber and said auxiliary chamber, a Venturi tube communicating with said auxiliary chamber and having its mouth proximately spaced below and in substantial coaxial registration with said nozzle, a spray head having a manually operable valve connected to said Venturi tube, the flow from said nozzle passing directly into said Venturi tube and to said spray head when said manually operable valve is opened.

2. The invention as defined in claim 1 in which each check valve comprises a ball and cage.

3. The invention as defined in claim 1 in which each check valve comprises a duckbill.

4. The invention as defined in claim 1 in which the bore of the nozzle is smaller than the bore of the Venturi tube.

5. The invention as defined in claim 1 in which the downstream opening of the nozzle is below the discharge opening of the auxiliary chamber.

6. An anti-syphoning mixing faucet valve comprising, an outer casing having an outlet communicating with a spout, a generally cylindrical body portion having a valve chamber and a discrete auxiliary chamber, said auxiliary chamber having a discharge opening communicating with said spout, said body portion having a pair of inlet passages each communicating with said valve chamber and each adapted to be connected to a respective liquid supply line, a check valve received in each of said passages and adapted to close opposite to the direction of normal flow through said passages, a control valve received in said valve chamber and having a pair of inlet passages each communicating with a respective one of said first mentioned inlet passages, conduit means in said body portion providing communication between said valve chamber and said auxiliary chamber, a Venturi tube communicating with said auxiliary chamber and having its mouth proximately spaced below and in substantial coaxial registration with said conduit means, a spray head having a manually operable valve connected to said Venturi tube, the flow from said conduit means passing directly into said Venturi tube and into said spray head when said manually operable valve is opened and said flow passing through said spout when said manually operable valve is closed.

* * * * *